United States Patent [19]

Brunet et al.

[11] Patent Number: 5,995,590
[45] Date of Patent: Nov. 30, 1999

[54] METHOD AND APPARATUS FOR A COMMUNICATION DEVICE FOR USE BY A HEARING IMPAIRED/MUTE OR DEAF PERSON OR IN SILENT ENVIRONMENTS

[75] Inventors: Peter Thomas Brunet, Round Rock, Tex.; Abraham P. Ittycheriah, Danbury; Chandrasekhar Narayanaswami, Wilton, both of Conn.; Michael Alan Picheny, White Plains; Bhuvana Ramabhadran, Ossining, both of N.Y.

[73] Assignee: International Business Machines Corporation, Armonk, N.Y.

[21] Appl. No.: 09/035,493

[22] Filed: Mar. 5, 1998

[51] Int. Cl.⁶ .................................................. H04M 11/00
[52] U.S. Cl. ..................... 379/52; 379/93.18; 379/93.24; 340/825.19
[58] Field of Search .................................... 379/52, 93.05, 379/93.08, 93.17–93.19, 93.23–93.28; 340/825.19; 455/466, 557, 556

[56] References Cited

U.S. PATENT DOCUMENTS

| 4,918,723 | 4/1990 | Iggulden et al. | 379/93.17 |
| 5,253,285 | 10/1993 | Alheim | 379/52 |
| 5,581,593 | 12/1996 | Engelke et al. | 379/52 |
| 5,809,425 | 9/1998 | Colwell et al. | 455/466 |

FOREIGN PATENT DOCUMENTS

| 3620938 | 1/1988 | Germany | 379/52 |
| 58-131857 | 8/1983 | Japan | 379/52 |
| 58-134568 | 8/1983 | Japan | 379/52 |
| 63-242054 | 10/1988 | Japan | 379/52 |
| 3-6163 | 1/1991 | Japan | 379/52 |
| 3-283852 | 12/1991 | Japan | 379/52 |
| 4-63044 | 2/1992 | Japan | 379/52 |
| 4-65960 | 3/1992 | Japan | 379/52 |
| 6-6436 | 1/1994 | Japan | 379/52 |

*Primary Examiner*—Wing F. Chan
*Attorney, Agent, or Firm*—Paul J. Otterstedt; Perman & Green, LLP

[57] ABSTRACT

A method and apparatus is disclosed that allows people to carry on unobtrusive phone conversations in business or other settings where it is either not possible or impolite to talk. In the system of FIG. 1, the telephone user one will listen in the same manner as with a regular telephone. However, he will not speak into the telephone microphone. User one instead employs a unit including a keyboard to enter the text corresponding to what he wants to say. The text is converted into a synthesized speech using TTS apparatus and a voice output is sent to the microphone of the phone apparatus. The telephone apparatus transmits the synthesized voice signal over a standard telephone line to a unit including a conventional telephone speaker 26 and telephone microphone. User two, the party using the telephone at the other end, listens to a synthesized voice, but user one listens to the actual voice of user two with the telephone speaker, unless user two is also using a system similar to that of user one. Handwritten text may also be used in the system by employing a computer with a character recognition program as an input. In such a case handwriting is converted into synthesized sound and inputted into the telephone microphone. The telephone system can be used by the hearing impaired without involving a third party human transcriber.

6 Claims, 3 Drawing Sheets

METHOD AND APPARATUS FOR A COMMUNICATION DEVICE FOR USE BY A HEARING IMPAIRED/MUTE OR DEAF PERSON OR IN SILENT ENVIRONMENTS

BACKGROUND OF THE INVENTION

1. Field of the Invention

The present invention relates to telephone communication systems, and more particularly to integrated messaging and voice free telephony.

2. Background Art

In telephone communication there are times at which people desire to talk normally into the telephone mouthpiece but are inhibited to do so because they. will disturb other people who are nearby.

With presently available technology, when a telephone call needs to be made, the speaker has to either disturb others or leave the room and handle the call in a more private setting.

The present invention provides a method and apparatus that allows people to carry on unobtrusive phone conversations in business or other settings where it is either not possible or impolite to talk. Some examples would be in business meetings, large conference rooms, game stadiums, airplanes and the like. The present invention is particularly significant with the use of cellular telephones which may be operated in any setting.

The present invention also allows a hearing impaired or deaf person to communicate using the telephone. The apparatus can be used either in isolation or as a service to this community. The apparatus allows both calls to be made as well as received. Currently, this community uses a relay service to communicate with others. This type of service is done with human intervention and is slow and rather expensive. Our apparatus allows the hearing impaired person more control over the call and reduces his long term cost of using relay services.

Some examples of presently available background technology include "text to speech" (TTS) systems that convert text to sound such as IBM's "Eloquent TTS", IBM's "Virtual Voices", and Bell Laboratories "Text to Speech Synthesis". This technology is presently used to read text passages aloud. For example, using this technology, a person can listen to his e-mail while he is driving. The text to speech conversion can be done in real time in software with presently available computer CPUs such as the 166 MHz Pentium processors.

Another technology referred to as "speech recognition" is also presently available. IBM's "ViaVoice" is an example of this technology. Speech recognition systems technology convert spoken words into text.

SUMMARY OF THE INVENTION

An object of the present invention is to provide a telephone communication system that permits flexible communication.

Another object of the present invention is to provide an asymmetric telephone system wherein the user can communicate without disturbing others who are nearby.

A further object of the present invention is to provide a telephone system that can be used by the hearing impaired without involving a third party human transcriber.

Other and further features, advantages and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention and, together with the description, serve to explain the principles of the invention in general terms. Like numerals refer to like parts throughout the disclosure.

DESCRIPTION OF THE INVENTION

Figure 1:
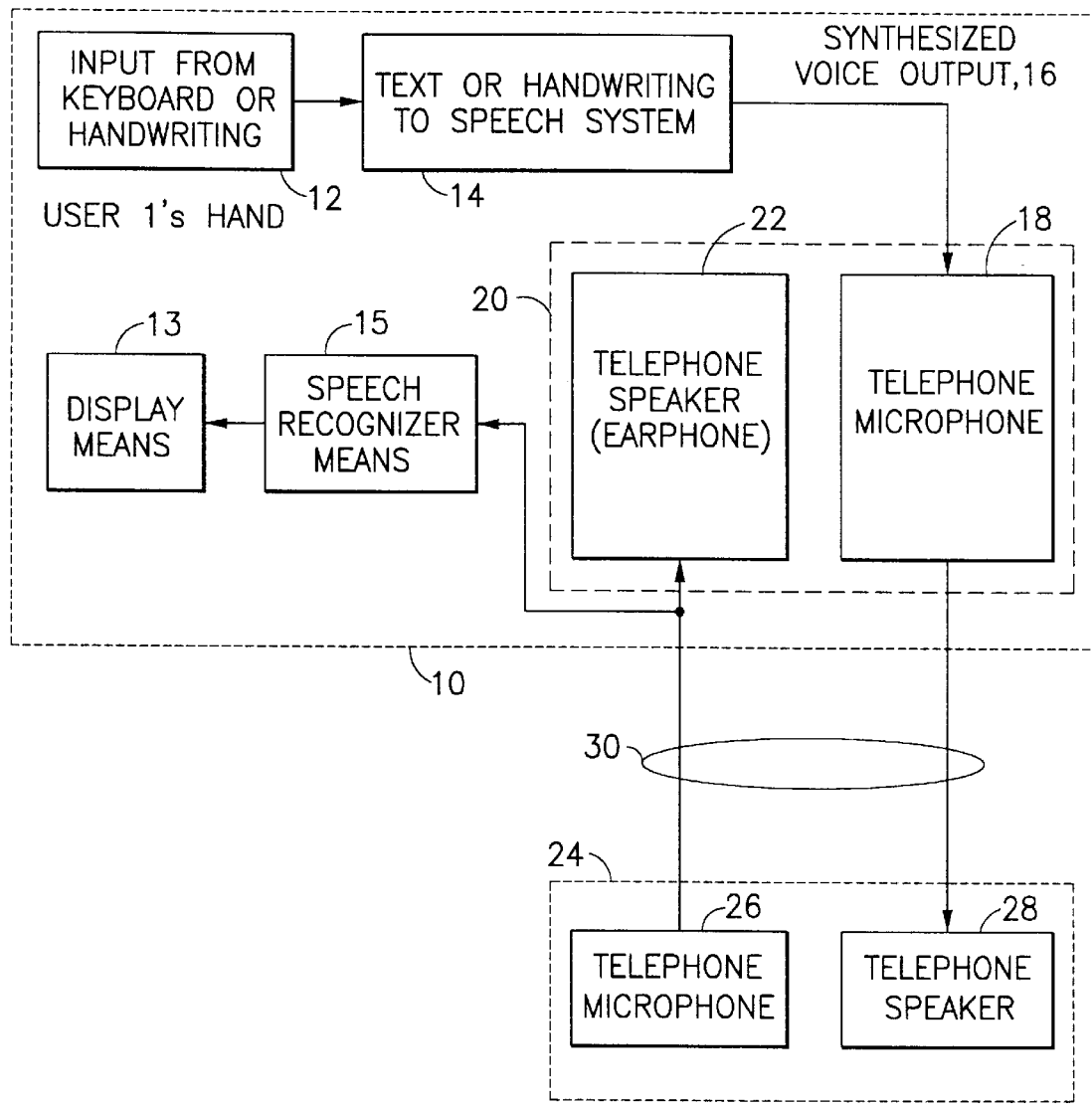
FIG. 1 is a schematic block diagram of an asymmetric telephone system according to the principles of the present invention.
Figure 2:
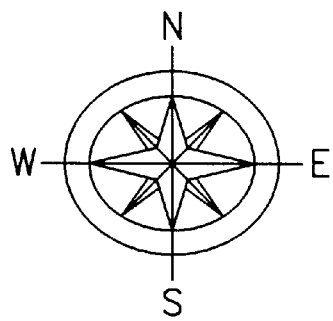
FIGS. 2–13 are illustrations of icons representing commonly used speech phrases.

The system of the present invention utilizes the fact that keyboards are very silent and non-intrusive. Referring to FIG. 1 an embodiment of an asymmetric form of communication is shown. In the system of FIG. 1, a telephone, user one will listen in the same manner as with a regular telephone. However, he will not speak into the telephone microphone. User one instead employs unit 10 including keyboard 12 to enter the text corresponding to what he wants to say. The text is converted into a synthesized speech using TTS apparatus 14 and a voice output 16 is sent to the microphone 18 of the phone apparatus 20. Telephone apparatus 20 transmits the synthesized voice signal over a standard telephone line 30 to unit 24 including a conventional telephone speaker 28 and telephone microphone 26.

User two, the party using the telephone at the other end, listens to a synthesized voice, but user one listens to the actual voice of user two with telephone speaker 22, unless user two is also using a system similar to that of FIG. 1.

Unit 10 also includes a speech recognizer means 13 and a display means 15 connected to the incoming speech signals from telephone microphone 26 employed by user two.

Handwritten text may also be used in the system of FIG. 1 by employing a computer with a character recognition program as a means of input in unit 10. In such a case handwriting is converted into synthesized sound and inputted into the telephone microphone.

Thus, in the system of FIG. 1, a signal cable from the keyboard 12 or a computer carries synthesized sound signals to the phone. The text to speech conversion may be done by the user's portable computer as the TTS apparatus 14 for example. The text to speech conversion may be done by any other suitable device as well. For example, the text may be transmitted and the text to speech conversion may be done by locating apparatus 14 at the other end of the line. Other system variations are also possible. For example, the internet may be used for the phone connection between instead of a regular phone line using available internet telephony.

The text to speech converter 14 of the present invention is somewhat different from present TTS systems. The TTS system of the present invention analyzes each word and converts it to sound after a possible spelling correction and sends the voice signal to the telephone microphone as soon as it detects a word boundary instead of waiting for complete sentences or paragraphs. Words that are miss-typed at keyboard 12 and then corrected by user one are converted to speech and sent again with an indication of the correction to user two. Retransmission begins from the word that was corrected.

In the TTS text to speech apparatus 14, the voice synthesis is tailored to the user's voice characteristics as closely as possible. This means that intonation, pitch, breathings, etc., can be altered as desired. In addition, security code words may be used to authenticate to user two that it is indeed the correct user one who is making the call and not an impersonator.

The present invention may be useful even when people are not using wireless phones. For example, a group of people in a shared office may use the same idea. In another example, the invention may be employed by doctors in an operating room that requires a low noise level. Passengers in an airplane is yet another example.

The present invention is also useful to the hearing impaired. The hearing impaired person can either receive an incoming call or make an outgoing call by keying in the phone numbers to be called. When the system connects the other party to the call, the system announces that the call is using a special device. The system then asks the other party to the call to say some sample sentences in order to enable the speech recognition system to adapt to the other party. This is not necessary if a speaker independent type of speech recognition system is being used. The system then allows the caller to speak a sentence. The sentence is transcribed by the speech recognition engine and the hearing impaired person may then choose to listen to the audio as many times as required, or may speak a sentence to the audio card in his device. The system records his speech and sends it to the caller over the telephone. Alternatively, the hearing impaired person may choose to type his response into the GUI interface and the text-to-speech system converts it to audio and then transmits it to the caller over the telephone. The device may also work as an answering machine, in the event the hearing impaired person does not take the call. In this case, a transcript of the external caller's message is saved for later retrieval by the hearing impaired person.

The present invention provides an advantage over other forms of communication such as e-mail and pagers because it provides immediate and interactive response.

Figure 3:
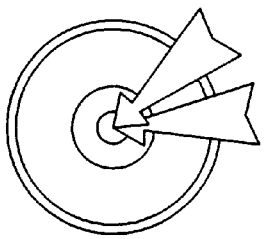
Figure 4:
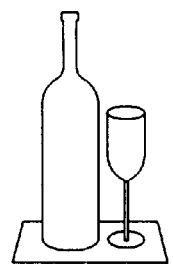
Figure 5:
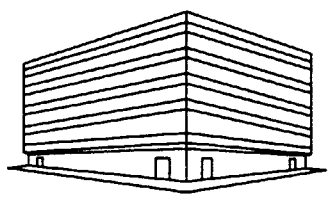
Figure 6:
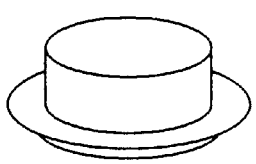
Figure 7:
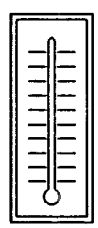
Figure 8:
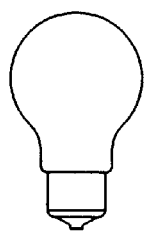
Figure 9:
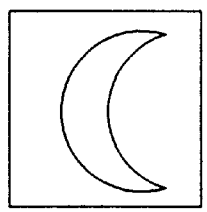
Figure 10:
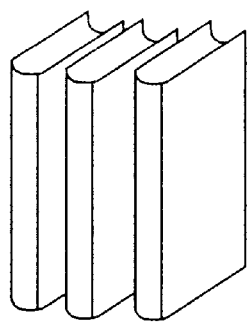
Figure 11:
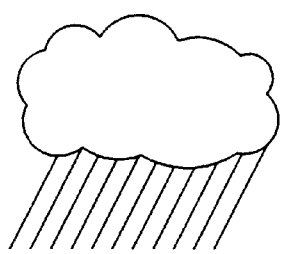
Figure 12:
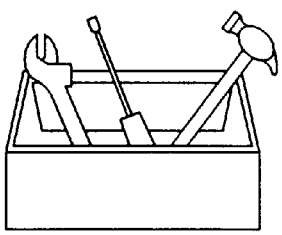
Figure 13:
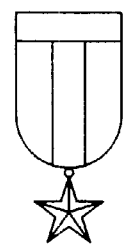

To simplify the task of typing or writing with apparatus 12, the system of the present invention may provide several preselected words or phrases for the user to employ. FIGS. 2–13 illustrate this concept. An example would be a salutation such as "Good morning, this is John Smith calling from New York". Parts of the phrase may be generated from available information. Such words as morning, afternoon, etc, can be derived from the present time at the user's location. The user's location may be derived from the latitude, longitude and area code of his location. In addition these phrases may be tailored to the recipient of the call. For example, the user's administrative assistant may receive one prolog whereas the user's spouse may receive another prolog. As shown in FIGS. 2–13, icons are used to indicate commonly used phrases. For example, FIG. 2 can be used for the phrase "make travel arrangements for me". FIG. 3 is used for "we were right on target." Likewise, FIG. 4 means "it is dinner time." FIG. 5 means "I will call you when I get back to the office." FIG. 6 means "it is time to celebrate." FIG. 7 means "how hot is it there." FIG. 8 means "I have an idea!" FIG. 10 means "read me my calendar." FIG. 11 means "it is raining here." FIG. 12 means "lot more work to do" and FIG. 13 means "good work". These icons are fully programmable and reconfigurable. This facilitates a short hand notation and reduces the amount of typing necessary. Previously composed text passages can also be played by marking them as preselected phrases. These techniques allow for more interactivity during the call and can also reduce the duration of the call.

Figure 14:
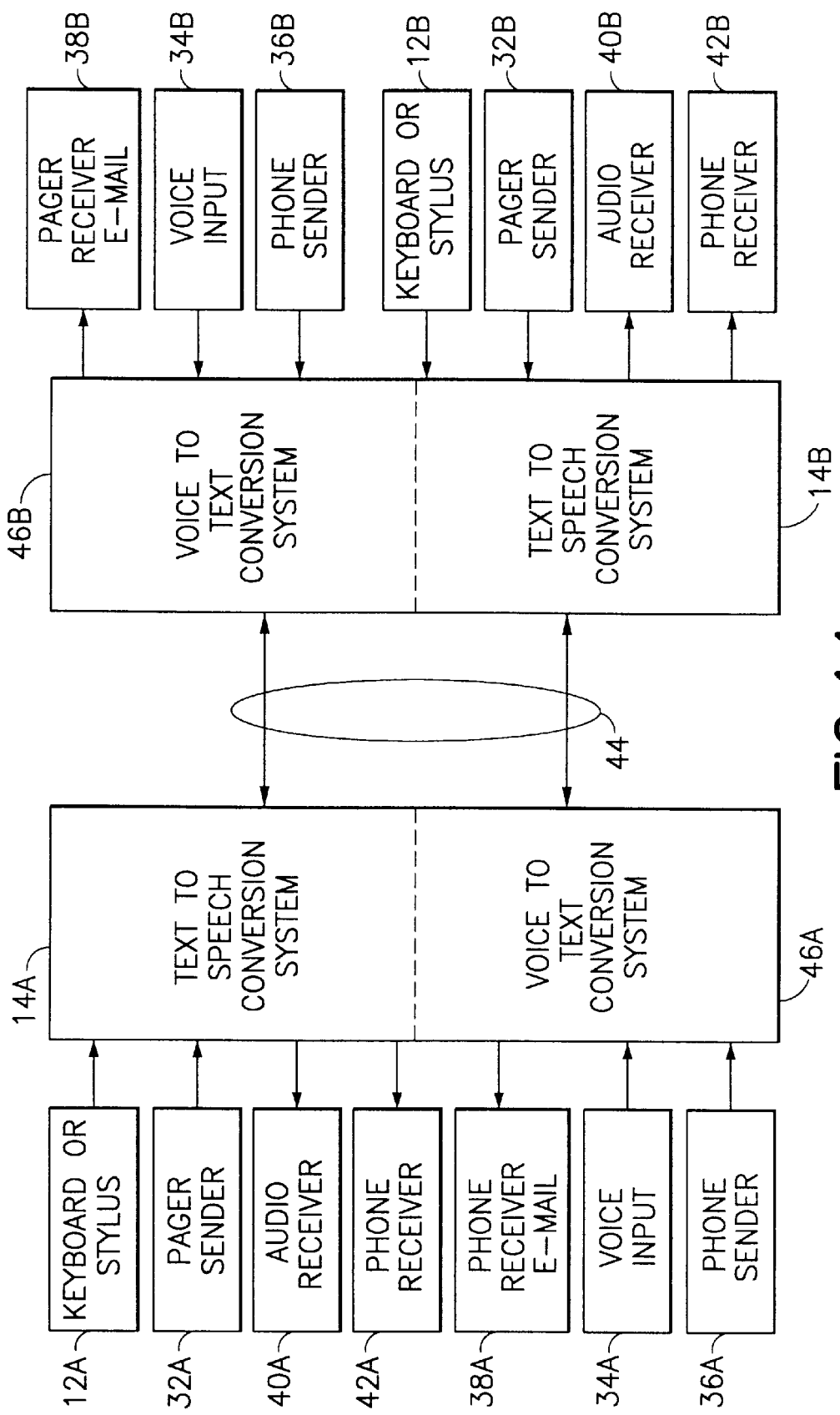
FIG. 14 is a schematic illustration of an integrated messaging system according to the principles of the present invention.

Integrated messaging systems according to the present invention may be embodied by using the technologies previously described. One embodiment of an integrated messaging system is shown in FIG. 14. In the system of FIG. 14, speech recognition technology may be used to convert voice into text that is delivered in a message that can later be either viewed as text or read out as voice mail by the user, who may be a hearing impaired, mute or deaf person. Such systems may also convert the whole conversation to text and make a text transcript of the duplex conversation. If the receiver of a telephone call is not present to receive the call, the call can be directed to either voice mail or e-mail with the aid of the voice to text converter.

More particularly, the system of FIG. 14 includes a text or handwriting converter means 14A having inputs from a keyboard or stylus 12A and pager sender 32A. A wired or wireless connection 44 is provided between converter means 14A and a voice to text converter means 46B that also has inputs from a voice input device 34B and a phone sender 36B. Inputs from the keyboard or stylus 12A and the pager sender 32A from a first user A are connected to text to speech converter means 14A and transmitted via connection 44 and voice to text converter means 46B and pager receiver, e-mail device 38B to a second user B. The voice to text converter 42B accepts audio message inputs from second user B via voice input 34B (such as a microphone) and phone sender 36B and transmits through text to speech converter 14A to first user A via audio receiver 40A and phone receiver 42A.

Likewise, inputs from the keyboard or stylus 12B and pager sender 32B from second user B are connected via text to speech conversion means 14B and wired or wireless connection 44, through which to text conversion means 46 to pager receiver E-mail device 38A. The voice to text conversion means 46A also accepts audio messages from voice input 34A (i.e., microphone) and phone sender 36A and transmits them via connection 44 through text to speech converter means 14B to second user B via audio receiver 40B and phone receiver 42B.

One skilled in the art will appreciate two components such as the keyboard, the pager (E-mail) sender, the audio receiver (sound card), phone sender and receive and voice input are all available as elements of and may be embodied in a personal computer.

While the invention has been described in connection with a preferred embodiment, it is not intended to limit the scope of the invention to the particular form set form, but, on the contrary, it is intended to cover such alternatives, modifications, and equivalence as may be included within the spirit and scope of the invention as defined in the appended claims.

What is claimed is:

1. A communication system for conducting a telephone communication without speaking and/or hearing comprising:
   a first communication terminal including, a telephone apparatus including a receiver for converting electronic signals to audio signals and a transmitter for converting audio signals to electronic signals, a text data input device including a first data input apparatus for generating a message in typed form and a second data input apparatus for generating a message in handwritten text form, and a text to speech conversion means connected to said text data input device for converting said text of said message into synthesized speech signals, wherein said first data input apparatus includes a plurality of single input keys, each input key representing a separate entire group of a plurality of selected words and phrases, and wherein said conversion means includes means for storing said words and phrases in the form of synthesized speech signals, and wherein said synthesized speech signals representing said message including said words and phrases are transmitted by said transmitter over a communication link in response to the actuation of said single input elements of said data input device;

a second communication terminal including speech to text conversion means connected to said text to speech conversion means of said first communication terminal by said communication link, wherein said speech to text conversion means is responsive to said speech signals from said text to speech conversion means for converting said speech signals to text signals, and a receiving means connected to said speech to text conversion means for receiving said text signals and providing a display of said text signals.

2. A communication system according to claim 1 further including voice input means connected to said speech to text conversion means for providing voice input signals that are converted to text by said speech to text conversion means and transmitted to said text to speech conversion device by said communication link for converting said converted text signals to voice signals, and an audio receiver means connected to said text to speech conversion means for receiving said converted voice signals transmitted from said speech to text conversion means.

3. A communication system according to claim 1 wherein said second communication means further includes a telephone microphone means connected to said speech to text conversion device for providing telephone voice signals for conversion to text signals, said text signals being transmitted to said text to speech conversion means of said first communication means by said communication link for conversion to speech signals, wherein said first communication means further includes a telephone receiver means connected to said text to speech conversion means for receiving said converted text signals transmitted from said speech to text conversion means of said second communication means.

4. A communication system according to claim 1 wherein said receiving means for providing a display of said text signals is an electronic e-mail message display means.

5. A communication system according to claim 1 wherein said first communication means further includes:

a speech to text conversion means, said speech to text conversion means responsive to speech signals for converting said speech signals to text signals, and a receiving means connected to said speech to text conversion means for receiving said text signals and providing an electronic e-mail message display of text signals, and wherein said second communication means further includes a text data input device for generating a message in typed or handwritten text form, and a text to speech conversion means connected to said text data input device for converting said message into speech signals.

6. A communication system according to claim 1 wherein said first communication terminal further includes a pager sender means for providing paging signals to said text to speech conversion means.

* * * * *